EFFECT OF FLOW OF REGENERANT THROUGH CATION EXCHANGER IN THE SAME VS. IN THE OPPOSITE DIRECTION TO THAT OF THE TREATED SOLUTION.

Patented Sept. 2, 1952

2,609,341

UNITED STATES PATENT OFFICE 2,609,341

METHOD OF PURIFYING WATER

Walter Juda, Cambridge, Mass., assignor, by mesne assignments, to Ionics, Incorporated, Cambridge, Mass., a corporation Application September 25, 1947, Serial No. 776,143

10 Claims. (Cl. 210—24)

This invention relates to a method of purifying natural waters which contain soluble salts, such as the metal (and ammonium) salts of inorganic acids with univalent bases, typically the alkali metal chlorides, sulphates and nitrates, and to apparatus suitable for carrying out the method.

In certain localities, such as the Negeb district of Palestine, the natural ground waters contain a high proportion of mineral salts, which render them unfit or unpleasant for human consumption or for agricultural purposes, such as irrigation.

In the conditioning of dilute aqueous solutions of salts by ion exchange, the solutions are passed over or through a bed of cation exchange material. When these cation exchange materials are initially in the so-called hydrogen form and are used to treat salt solutions, the effluent is an acid solution which may subsequently be treated by an anion exchange material to remove the acid. When the cation exchanger is exhausted, it may be regenerated to the hydrogen form by means of a strong acid.

It is the practice of the prior art, in such operations, to pass both the solution to be treated and then the regenerant solution through the exchanger in the same direction. As a result it is necessary to regenerate the exchange bed substantially completely, as otherwise it cannot effectively exchange cations subsequently. In such procedure, the exchanger bed is not only subjected to maximum mechanical attrition but undergoes a succession of substantially complete reactions which cause chemical attrition and seriously reduce the life of the exchangers. Furthermore, in order to obtain substantial or complete regeneration a large excess of regenerant is required and this excess is wasted. For example, it is not unusual to use more than twice the stoichiometric amount of acid to regenerate the cation exchange material.

Thus, in the demineralization of natural salt waters by ion exchangers, the salts in the incoming water solution are converted substantially into the corresponding acids by a passage through a cation exchange bed in the hydrogen form. For example, a water containing sodium chloride will, after treatment, comprise a solution of hydrochloric acid containing but little sodium, in solution, if any. This acid effluent may then be passed through an anion exchanger bed which removes substantially all of the hydrochloric acid.

Such procedures have the drawback that they require cation exchanger beds which are substantially completely regenerated to the hydrogen form, which requires a large excess and hence a waste of acid. They also present the disadvantage of using the anion exchanger beds for substantially pure acid solutions which greatly limits the effectiveness of acid removal as will be shown below.

It is an object of the present invention to provide a method and apparatus which shall be effective to remove or to reduce the content of mineral salts in natural waters to such a degree that the purified water may be used for agricultural purposes, including irrigation and the like, and for human consumption as drinking water and industrial or household use, as a practical economic operation. Other objects will appear from the following disclosure.

In the following I mean by "exhausted ion exchanger bed" that form of the exchanger which consists substantially of the reaction product between the exchanger and the solution to be treated. For example, in the demineralization of water, the hydrogen form of the exchanger, R—H, is contacted with the solutions to be purified which may be, for example, a dilute sodium chloride solution. In this case the "purification" reaction in the cation exchange bed may be written according to Equation I, from left to right (I) 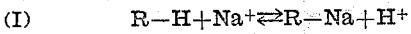

Similar reactions with proper coefficients may be written for other cations in the waters to be purified including potassium, ammonium, etc. In Reaction I, R—H is the active form of the exchanger which converts the salts into the acids, and R—Na is the exhausted form of the exchanger. By "partial regeneration" it is meant that only part of the exhausted exchanger, for example part of the R—Na form in I, is regenerated. And when anion exchange is used as the second step in the demineralization of water the "basic form" of the anion exchanger, X—NH$_2$, is contacted with the acid effluents from the preceding cation exchange bed. The anion exchangers include carbonaceous condensation products containing basic amino-groups available for reaction with acids. In the case of anion exchange, or acid removal, the "purification" reaction may be written according to Equation II, from left to right (II)     X—NH$_2$+H$^+$+Cl$^-$⇌X—NH$_2$.HCl or

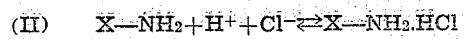

Similar reactions with proper coefficients may be written for other strong acids including sulfuric acid, nitric acid, etc. For example, in Reaction II X—NH₂ is the active basic form of the exchanger which removes the acid, and X—NH₂.HCl is the exhausted salt form of the exchanger.

The cation exchanger in the sodium form or other form of a univalent metallic cation may be regenerated to the hydrogen form with a strong acid, for example. The X—NH₂.HCl may be regenerated by means of an alkaline solution, for example a solution of sodium hydroxide, ammonia, sodium carbonate, or the like.

It is discovered, in accordance with the present invention, that a greater efficiency and effectiveness of the exchanger material is attained if the charge of exhausted exchange material in the cation exchanger is generated or regenerated only partially to its other cation or, especially, to its hydrogen form, and if the amount of regenerated exchanger in admixture with the exchanger left in the exhausted form increases in a progressively gradient degree, or in increasing proportion, in the direction of the course of the water to be purified in its passage thereover or therethrough.

It is further found that, in accordance with the present invention, water containing such mineral salts, or alkali metal salts of inorganic acids, may be passed into contact with cation-exchangers, preferably carbonaceous exchangers including sulfonated coals and resinous exchangers containing sulfonic acid groups, or carboxylic acid groups, or phenolic groups, or combination of these groups, available for cation exchange, such as: a sulfonated coal prepared according to U. S. Patent No. 2,191,060; cation-exchange resins of the type of a modified phenol-formaldehyde methylol sulfonic acid; or of the type of p-phenol-sulfonic acid formaldehyde. In general, cation exchangers of a carbonaceous nature are either of the sulfonated coal type or of the type of modified phenol-aldehyde condensation products, in a different base or cation form or, more particularly, in hydrogen form, thereby to replace the alkaline earth and/or alkali metal component of the salt in the water with the base metal or other cation of the exchanger or, more particularly with hydrogen ion of the exchanger available for exchange.

It is now found that this exchange is done especially effectively and efficiently if the water to be treated is passed through the exchange material in the direction of the increasing proportion of active regenerated exchanger material.

For example, the concentration of the exchange material, in respect of its other cation, or especially, of its hydrogen-form, may advantageously increase linearly (throughout a loose, permeable charge of exchange material) from the bottom to the top when the water to be purified is to be passed upwardly therethrough in a continuously contacting stream.

It is further found that such a graduated regeneration of a charge of exchanger material, upon substantial exhaustion of its exchange capacity, may be readily accomplished by introducing the regenerant into the top of the charge of exhausted exchange material and allowing it to pass downwardly through the charge by gravity, e. g., until filled, and then withdrawing the spent regenerant, rinsing the charge from excess of regenerant if desirable or necessary—and then resuming the purifying operation with the thus regenerated charge. In this way, governed by the amount, time, and nature of the regenerant used, the top of the charge of exchanger material will be regenerated to the greatest degree, or possibly completely, and successively lower portions of the charge will be regenerated to a progressively lesser degree, in a substantially linear gradient from top to bottom of the charge. The flow of both solutions, chiefly the upflowing one, should be controlled to maintain the gradient of ion-exchange capacity, lest it be destroyed, as by teetering of the charge, and its advantages be lost.

It is also further found that in the regeneration of such cation or hydrogen exchange materials it is far more efficient, with respect to the consumption of regenerant reagent, to effect a partial rather than a complete regeneration of the charge as a whole. Thus, to regenerate the exhausted exchange material completely to hydrogen form with a strong acid, a large excess of acid is required, beyond that which would be equal to the hydrogen ion equivalent which is introduced into the exchange material and thus rendered effective for exchange purposes with the water to be purified. Such excess of regenerant acid is wasted.

On the other hand, it is now found that if the cation exchange material is regenerated with a relatively concentrated solution of the regenerant (at least five times as concentrated as the concentration equivalent of the water to be purified, but preferably much higher) in an amount sufficient to regenerate the total charge of exchange material to about one-third to two-thirds of its ultimate exchange capacity when fully regenerated, the regenerant will be completely or substantially reacted and effective in removing the cation of the exhausted exchange material and replacing it with its full equivalent of corresponding other cations, or with hydrogen ion, to convert the exchange material to its hydrogen form, as the case may be.

In passing such waters to be purified then upwardly through the charge of cation exchange material, which presents a graduated exchange potential or capacity from the bottom to the top of the charge and an over-all exchange capacity after partial regeneration of about one-third to two-thirds of its total capacity available for the particular exchange or exchanges involved, it is found that the water will have approximately one-fourth to two-thirds of its cation component displaced by the cation of the exchange material or by hydrogen ion if the exchange material is in hydrogen-form.

The water as thus purified by the exchange of approximately one-fourth to two-thirds of its cation content for a different cation or hydrogen—as the case may be—may be passed on for further treatment.

In the case of hydrogen ion exchange, the resulting equivalent of free acid is readily removed by insoluble anion exchange materials. Thus, it is further found in the case of hydrogen ion exchange as described above, that the mixed acid-salt solution from the cation-exchanger purification step which contains residual metallic ions in solution in amount, expressed in chemical equivalents, of at least one-half of that of the hydrogen ions, may advantageously be percolated through an exchanger bed containing carbonaceous anion exchangers, such as are described, for example, in U. S. Patents Nos. 2,151,883; 2,198,874; 2,246,527; 2,251,234; 2,259,169; 2,290,345; 2,341,907; 2,354,671; 2,356,151; 2,362,086 and 2,402,386, and which include, for example, resins made by condensing: aromatic polyamines and aldehydes with or without carbohydrates and with or without ketones; aliphatic polyalkylene polyamines with aldehydes and ketones with or without phenols, etc. Thereby substantially all of the acid is removed more efficiently than is possible in acid removal by the same exchangers acting upon acid solutions containing no additional dissolved metal salts of the same acid or acids.

Anion exchange is a slow process resulting in the adsorption of the acid by the exchanger. The adsorption product is not very stable and as more water (or solution) is passed over it some of the acid is removed from the adsorption product by hydrolysis. It is now found that this hydrolysis is substantially decreased by the presence of sufficient amounts of neutral salts of the adsorbed acid. Thus, when (1) a given pure acid solution of known strength and (2) a mixed acid-salt solution of the same acid strength are passed through identical basic exchanger beds at the same rates, then the effluent of the pure acid solution contains a higher residual acid content than the effluent of the mixed acid-salt solution.

In the successive cation and anion exchange steps above described the salt content of the waters to be purified has been reduced efficiently by approximately one-fourth to two-thirds.

By successive repetitions of these alternate treatments, with hydrogen ion- and anion-exchange materials, the salt content of the original water to be purified may be progressively reduced to substantially any degree desired, since the proportionate removal of the cations and anions contained in the water is governed primarily by the final ion-exchange capacity of the exchanger and time of contact therewith, and not by the concentration of the salt or salts in the water to be purified.

A typical and representative example of the application of the invention will be described as carried out upon substantially neutral water containing sodium chloride in solution and with reference to the accompanying drawings in which.

Figure 1:
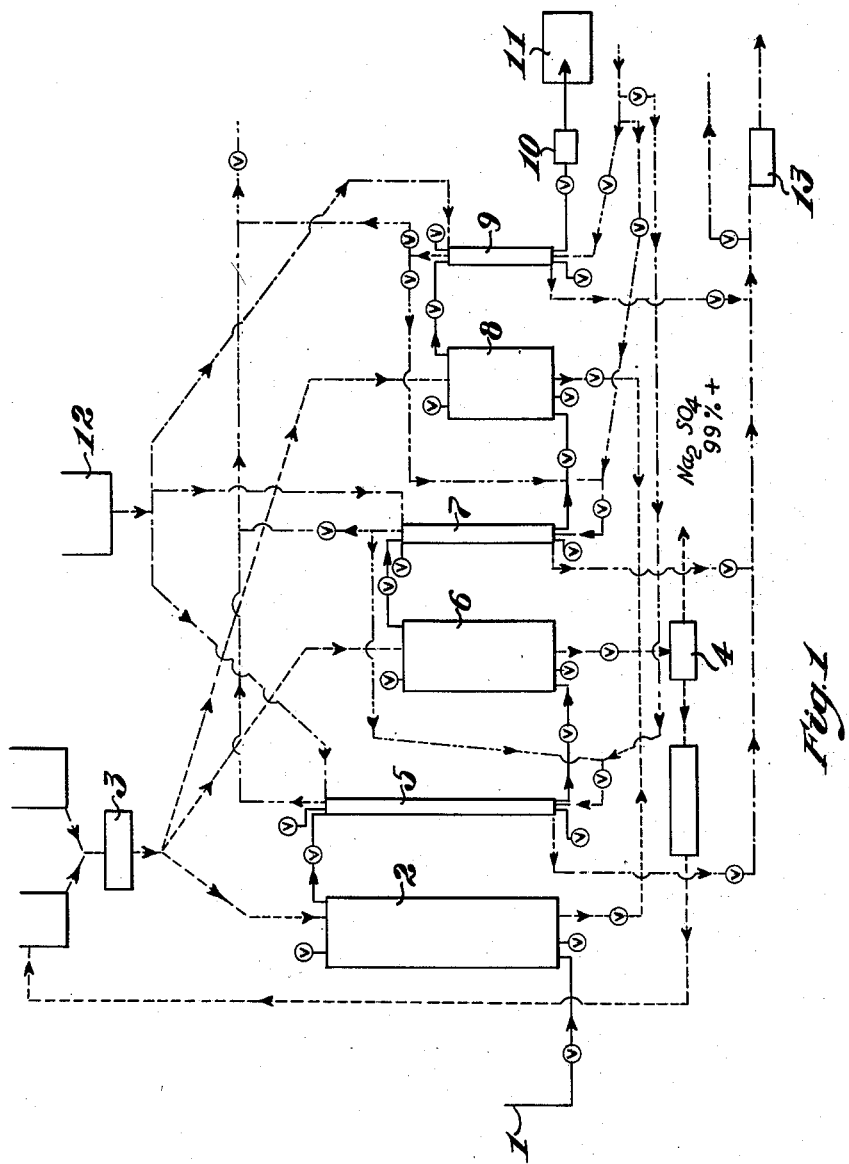
Fig. 1 is a diagrammatic flow sheet of the entire process and apparatus.

If the water to be purified comes directly from its natural source, and if it contains alkaline earth metal ions, it may advantageously be given a preliminary base-exchange treatment to remove alkaline earth metals therefrom or to exchange them for an alkali metal, such as sodium.

In either condition, the water to be purified, 1, is passed as indicated by solid lines, upwardly through a cation-exchanger 2, which is loosely packed with a carbonaceous cation-exchange material, in hydrogen-form, preferably presenting initially (or as regenerated in each cycle), one-third to two-thirds of its total hydrogen-ion capacity. Moreover, its hydrogen-form or specific ionic exchange capacity preferably presents a linearly increasing gradient from the bottom of the charge to the top, so that the effluent water finally comes through and exits from the maximum concentration or intensity of ionic-exchange potential of the exchange material in the exchanger charge. The rate of upflowing solution must not be so great as to cause teetering, or other disturbances, of the bed of resin, lest the resin be agitated so as to disturb the gradient of ion exchange capacity that exists through its height. The flow throughout must be controlled to maintain the established gradient of exchange capacity.

When the exchange material of the charge becomes exhausted, which occurs relatively sharply when its hydrogen has been substantially completely exchanged for and replaced by sodium from the water being purified, it is regenerated by introducing sulphuric acid of a relatively high concentration (e. g. 0.5 N) from a suitable supply 3, preferably at the top of the charge and allowing it to flow downwardly through the exchanger in an amount such as to equal approximately one-third (to two-thirds) of an equivalent of the capacity of the charge of exchange material, or of the total hydrogen ion exchange capacity available for the particular exchange or exchanges involved, the amounts being expressed in chemical equivalents. By so doing, the regenerant acid is substantially completely converted to nearly pure sodium sulphate, and its hydrogen ion content is substantially completely taken up by the exchange material, as shown by the following detailed experimental description and by Tables I and II. The data given in Table I were obtained by operating as follows. A glass column, 90 cm. long and 4 cm. in diameter was packed with 880 cc. of wet cation exchanger, containing $w=462.5$ grams of air-dry material; the exchange material used is a condensation product of para-phenol sulphonic acid with formaldehyde and has the structure

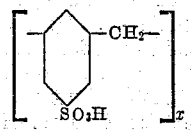

(see Ind. Eng. Chem., 38, 46 (1946)). (It is marketed under the names Dowex 30 or Nalcite MX.) The capacity of this exchanger, M, expressed in milliequivalents of exchangeable cations per gram of air-dry exchanger, in the sodium ion-hydrogen ion exchange in chloride solutions, was measured by converting the exchanger to the hydrogen form by means of a large excess of sulfuric acid, washing it free from sulfate, converting it completely to the sodium form by means of a large excess of a sodium chloride solution (8 liters of concentration 1.5 N), and titrating the hydrogen ion concentration in the effluent; expressed as milliequivalents per gram of dry exchanger, the capacity, M, for Dowex 30 was found in this manner to be 1.80 meq. H+/gram air-dry exchanger.

After washing the exchanger in the column free from chloride with excess water, a volume $V_{ac}$ (in liters) of sulfuric acid solution of concentration, $N_{in}$ (in equivalent per liter), was passed downward through the bed at the rate of 30 cc./min., the bed was drained, washed until free from sulfate ions using a volume, $V_w$ (in liters), of washwater; the total effluent, $$V = V_{ac} + V_w$$

was collected and an aliquot was titrated with standard alkali to a pH of 7 to determine the residual sulfuric acid concentration, $N_{res}$ (expressed in equivalents per liter). In this regeneration the utilization of acid may then be expressed as the fraction $$(N_{in}V_{ac} - N_{res}V)/N_{in}V_{ac}$$

and the extent of bed regeneration as the fraction $(N_{in}V_{ac} - N_{res}V)/1000\ wM$ (because the numerator of the two fractions is the number of equivalents of sodium ions removed from the bed, and the denominators are, respectively, the number of equivalents of sulfuric acid used for regeneration and the total number of equivalents of exchangeable cations in the bed). Table I summarizes twelve experimental runs of partial regeneration carried out in this manner, each run being an average of several determinations. Inspection of Table I shows (1) that the smaller the extent of regeneration, the more complete the utilization of acid, and (2) that the more dilute the acid the greater the extent of regeneration for a given utilization of acid. For practical purposes it is seen from Table I that the concentration of acid should not exceed one equivalent per liter (one normal) in order to attain a reasonable extent of regeneration with substantial utilization of acid. On the other hand, lower concentrations of acid are favorable but the lower limit is dependent upon the concentration difference between the acid regenerant and the salt waters to be purified; that is, to be practical the acid concentration should be at least five times that of the salt waters so that not more than 20% of the water is tied up in the regenerating solution.

The operating conditions of run No. 8 were chosen in which 97% of the sulfuric acid was utilized and 34.3% of the bed was regenerated to the hydrogen form, using 0.48 normal sulfuric acid as the regenerant. Aliquots of the spent regenerating solution of run No. 8 were worked up for recovery of sodium sulfate (before dilution with washwaters). 50 cc. aliquots of the spent sulfuric acid solution were evaporated to constant weight in an oven kept at about 65° C., giving the total salt content. The residual salts were dissolved in about 50 cc. of distilled water, titrated with 0.01 N NaOH to a pH of 7, and the acidity was expressed as sodium hydrogen sulfate. Then the total sulfate was determined by precipitation as barium sulfate. The difference between total salts and the sum of sodium acid sulfate and sodium sulfate was assumed to be sodium chloride since the presence of chloride was shown by a silver nitrate test.

Table II gives the volume (in liters) of spent sulfuric acid solution, recovered by draining the bed before washing, $V_{Na_2SO_4}$, the grams per liter of salt recovered, and its analysis.

The purity of the recovered anhydrous sodium sulfate ($Na_2SO_4$) was about 99%. It should be noted that the choice of conditions giving in practice more than 95% utilization of sulfuric acid made it possible to recover almost pure anhydrous sodium sulfate ($Na_2SO_4$). On the average, without any special desire to drain the bed thoroughly before washing, about 80% of the sulfuric acid was easily recovered as $Na_2SO_4$ in the concentrated (0.48 N) regenerant effluent. In this case the rest remained in the wash waters.

The degree of regeneration to hydrogen-form will be substantially complete upon the exchange material at the top of the charge where the regenerant acid is introduced—and decrease in linear progression from the top of the charge to the bottom, as shown by Table III, which shows data obtained in duplicate runs using the operating conditions of run No. 8 of Table I.

To determine the "gradient" of exchanger in the hydrogen form down the depth of the bed after regenerating the bed partially according to the operating conditions of run No. 8 the column was then divided into four equal segments; numbering the segments 1 to 4 from top to bottom, the extent of regeneration in each segment, expressed as milliequivalents of exchangeable hydrogen divided by $wM/4$, was determined by percolating through each segment a known volume of normal solution of sodium chloride until no further exchange took place (as evidenced by the absence of hydrogen ions in the effluent), collecting the total effluent and determining its hydrogen ion concentration by titration with standard alkali to a pH of 7. Table III shows that the decrease in the content of exchanger in the hydrogen form down the bed was roughly linear.

Figure 2:
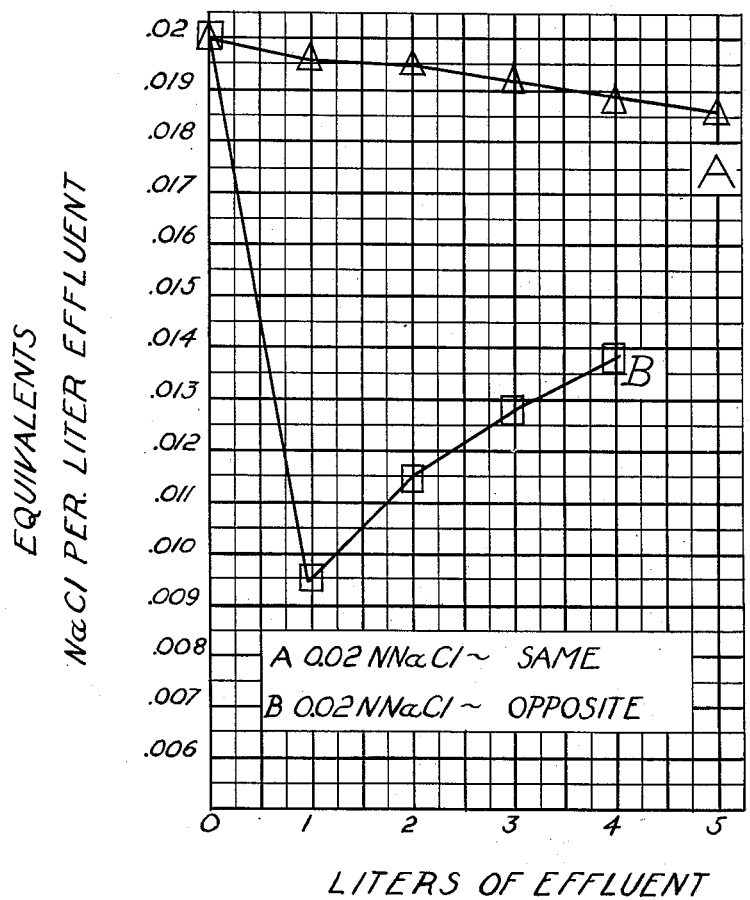
Fig. 2 is a graph showing the relative efficiencies obtained by passing the water to be purified through a cation exchange material in the direction of increasing and of decreasing exchange potentials therein.

The improved results attained by passing the solution to be treated through a bed of ion exchange material in the direction of progressively increasing capacity (counter to the flow of regenerant) over the results attained by passing the solution in the same direction as the regenerant solution are shown in Fig. 2. In each run, the results of which are shown by curves A and B, a bed regenerated from the sodium form to the hydrogen form to possess a gradiently distributed exchange capacity of about 35 per cent of the total capacity was used to treat a 0.02 N NaCl solution. After regeneration each bed was washed free of residual regenerant by water and then drained of water. Aliquots of effluent after each successive liter from each run were analyzed for sodium. It will be seen from Fig. 2 that the removal of sodium was far more effective when the solution being treated was passed counter to the direction in which the regenerant was flowed (curve B) than it was when that solution was passed in the same direction as the regenerant (curve A).

TABLE I

| Run No. | $V_{ac}$ (liters) | $N_{in}$ (eq./l.) | V (liters) | $N_{res}$ (eq./l.) | Utilization of acid (percent) $\frac{100(N_{in}V_{ac}-N_{res}V)}{N_{in}V_{ac}}$ | Extent of Regeneration $\frac{(N_{in}V_{ac}-N_{res}V)100}{1000\,w\,M}$ |
|---|---|---|---|---|---|---|
| | | | | | Percent | Percent |
| 1 | 1.01 | 1.00 | 4.21 | 0.120 | 50 | 60.1 |
| 2 | .72 | 1.00 | 2.74 | 0.109 | 59 | 50.5 |
| 3 | .50 | 1.00 | 1.96 | 0.082 | 68 | 40.4 |
| 4 | .32 | 1.00 | 1.84 | 0.035 | 80 | 30.4 |
| 5 | 1.63 | 0.48 | 3.42 | 0.081 | 65 | 60.4 |
| 6 | 1.22 | 0.48 | 3.87 | 0.043 | 72 | 50.4 |
| 7 | 0.88 | 0.48 | 2.07 | 0.041 | 80 | 40.2 |
| 8 | 0.62 | 0.48 | 1.99 | 0.005 | 97 | 34.3 |
| 9 | 0.54 | 0.48 | 1.85 | 0.001 | 99 | 30.6 |
| 10 | 1.72 | 0.33 | 3.96 | 0.036 | 75 | 50.4 |
| 11 | 1.15 | 0.33 | 2.45 | 0.0155 | 90 | 40.5 |
| 12 | 0.78 | 0.33 | 2.55 | 0.0012 | 99 | 30.3 |

TABLE II

| V Na₂SO₄ (liters) | Salt Recovered (grams/l.) | Analysis of Salt | | |
|---|---|---|---|---|
| | | Na₂SO₄, percent | NaHSO₄, percent | NaCl, percent |
| 0.55 | 27.4 | 99.09 | 0.03 | 0.88 |

TABLE III

*RH gradient in segmented bed containing the p-phenol-sulfonic formaldehyde resinous exchanger*

| Segment No. | Percent RH in Bed | |
|---|---|---|
| | Run I | Run II |
| 1 | 70.0 | 68.8 |
| 2 | 36.2 | 37.3 |
| 3 | 18.6 | 17.9 |
| 4 | 8.7 | 8.9 |

The sulphuric acid solution, used for regeneration of the exchange material, and containing or substantially consisting of the sodium sulphate into which it is thus converted by the regeneration reaction, may be led to the solar still 4 or like evaporating device for recovery of the sodium sulphate salt therefrom in substantially pure condition, and pure distilled water.

The effluent of treated and partially purified water coming from the exchanger 2, contains free hydrochloric acid equivalent to the hydrogen-ion exchange which has been effected thereon. It is passed to the top of an anion exchanger 5 and passed downwardly therethrough. The acid component is removed by combination with the anion exchange composition or de-acidifying agents which may be of the organic anion type such as those referred to in the patents and specifically mentioned above, for this purpose. This effects complete removal of the free acid by direct combination therewith in molecularly equivalent proportions.

Upon coming from the exchanger 5, therefore, the water is purified to the extent of the removal of one-fourth to two-thirds of its sodium chloride content, but otherwise substantially unchanged, since both the cation- and anion-exchange materials are insoluble.

With some natural waters, such degree of purification and removal of its salt content may be sufficient to render it useful for agricultural or other purposes or even potable for human consumption. However, a greater degree of purification and salt removal is usually necessary or at least desirable. To effect such purification and removal, the effluent from the anion exchanger 5 may be passed upwardly through a second cation exchanger 6 (like exchanger 2 but of smaller capacity) thence downwardly through a second anion exchanger 7 (like anion exchanger 5 but of smaller capacity) and again upwardly through a third still smaller cation exchanger 8, downwardly through a third still smaller anion exchanger 9, and finally through a suitable metering device 10 to a storage reservoir 11, for the purified water supply thus produced, ready for use.

In general, natural waters often contain, besides chloride, sulfate, nitrate, bicarbonate anions, and, besides sodium, calcium and magnesium and potassium cations. For the purpose of illustrating how the stepwise purification described above may be carried out in detail the following experimental procedure was used involving the purification of a mixed neutral chloride, nitrate and sulfate solution containing alkali metal ions (sodium and potassium). (It should be noted that the bicarbonate anion is not appreciably removed by anion-exchangers as it is derived from a weak acid. Furthermore, calcium and magnesium may be present in the water, but may be removed first by a calcium-sodium exchange.)

The air-dry carbonaceous cation exchanger identified above and called hereafter Dowex 30, having a capacity of 1.8 meq./gram (see above) and an aliphatic amino-type synthetic anion exchange resin known as DeAcidite, were used in the following experiments.

To prepare the basic form of the aliphatic amino-type synthetic anion exchange resin DeAcidite, a 250 gram portion of this exchanger, as received, was contacted in a 3 liter flask with 1500 cc. of a 7% solution of sodium carbonate for two hours. The exchanger was then collected at the pump, washed with distilled water until the effluent was free from chloride and sulfate ions (silver nitrate and barium chloride tests) and had a pH of 7-8. The exchanger was then dried to constant weight at 80° C., cooled, screened and the 20/40 mesh portions were used for further tests. The capacity of the above basic exchanger, M'', expressed in milliequivalents of acid adsorbed per gram of bone dry exchanger (dried at 80° C.) was measured by converting samples of the basic form completely to the salt forms; this was done by means of a large excess of sulfuric acid and nitric acid, respectively, and by means of mixtures of

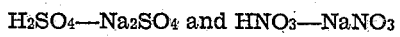

$H_2SO_4$—$Na_2SO_4$ and $HNO_3$—$NaNO_3$ respectively, the latter mixtures containing at least 0.5 part by weight of salt, but not more than 2 parts of salt for one part by weight of acid. The capacity, M', expressed as milliequivalents of acid per gram of bone dry exchanger was found in this manner to be between 7.4–8.0.

Exchanger beds were arranged as shown in Fig. 1 with the dimensions of the cation and anion exchanger columns 2, 6, 8, 5, 7, 9 given in Table IV.

TABLE IV

*Data on exchanger columns*

| Bed No. | Type of Exchanger | I. D. of Column | Length of Column | Weight of Exchanger, grams |
|---|---|---|---|---|
| | | Inches | Inches | |
| 2 | Dowex 30 | 2.56 | 6 | 200 |
| 5 | DeAcidite | 1.25 | 5.75 | 15 |
| 6 | Dowex 30 | 1.56 | 10.25 | 134 |
| 7 | DeAcidite | 1.00 | 5.25 | 10 |
| 8 | Dowex 30 | 1.56 | 6.75 | 89 |
| 9 | DeAcidite | 0.625 | 7.5 | 6.7 |

The Dowex 30 exchangers in the columns were first converted completely into the sodium form by contacting them with a normal sodium chloride solution until the effluent had a pH of 6.5, washing it with distilled water until the effluent was free from chloride (silver nitrate test) and neutral to methyl orange.

To prepare the partially regenerated cation exchange beds, 268 cc., 178 cc. and 119 cc. of 0.504 normal sulfuric acid were passed, respectively, through the Dowex columns 2, 6 and 8. The effluents were collected, analyzed for $H_2SO_4$ and used for the recovery of sodium sulfate as described above. The Dowex columns 2, 6 and 8 then contained 33–35% of the exchanger in the hydrogen form, distributed down the depth of the bed as described above.

22.67 grams of potassium chloride, 57.82 grams of sodium chloride, 39.58 grams of sodium sulfate and 8.84 grams of sodium nitrate were dissolved in approximately 200 liters of distilled water and the salt content of this solution, determined by evaporating samples to dryness, was found to be 688 parts per million total salts. The pH of this solution (checked by a glass electrode) was 7.0. 28.8 liters of this solution were treated until substantial exhaustion of the beds.

The progressive demineralization of this solution was followed by tests including:

(1) The measurement of the pH of the influent to, and of the effluent from, the Dowex columns showing the operation of the cation exchanger.

(2) The determination of the contents in total salts of the effluents from the three DeAcidite beds by evaporation to dryness.

TABLE V

*Data on stepwise purification*

| Step No. | Volume Passed Through in liters | pH | | P. P. M. | |
|---|---|---|---|---|---|
| | | Influent | Effluent | Influent, Dowex | Effluent, DeAcidite |
| 1 | 2 | 7.0 | 2.3 | 688 | 282 |
| 1 | 10.8 | 7.0 | 2.6 | 688 | 331 |
| 1 | 20.3 | 7.0 | 2.9 | 688 | 363 |
| 1 | 27.8 | 7.0 | 2.9 | 688 | 581 |
| 2 | 2 | 9.6 | 2.8 | 282 | 101 |
| 2 | 10.8 | 3.8 | 3.0 | 331 | 173 |
| 2 | 20.3 | 3.0 | 2.9 | 363 | 343 |
| 2 | 27.8 | 2.9 | 2.9 | 581 | 578 |
| 3 | 2 | 9.6 | 2.3 | 101 | 81 |
| 3 | 10.8 | 3.4 | 2.7 | 173 | 109 |
| 3 | 20.3 | 3.0 | 2.7 | 343 | 340 |
| 3 | 27.8 | 3.3 | 3.0 | 578 | 498 |

Table V gives the values of the pH and of the total solid contents of the solution at the various points as indicated above; the values were determined on samples taken after having passed through the bed the volumes of solution shown under column 2 of Table V.

The total effluent (28.8 liters) was collected and analyzed. It had an average total salt content of 246 parts per million.

It is seen from Table V that for example the DeAcidite, action of run No. 1, resulted in an increase of pH of the first two liters from 2.3 to 9.6; the alkaline pH of 9.6 which was probably due to a splitting of the added neutral salts by the basic exchanger, shows clearly the beneficial effect of the added salts opposing hydrolysis.

Three such successive alternate treatments, effecting the removal of approximately one-third of the sodium chloride content from the water as delivered to each, are sufficient to reduce a water containing, for example, 688 p. p. m. total salts (chloride, sulfate and nitrate of sodium and potassium) salts, to 246 parts per million. This is sufficiently pure to render such water suitable for human consumption and many agricultural purposes, thus making possible the irrigation of districts which heretofore have not been useful for agriculture. If a greater degree of purification is necessary or desired, additional exchanger units may be employed, in like manner.

The regeneration of the hydrogen ion exchange material in exchangers 6 and 8 may be effected by sulphuric acid, as in exchanger 2, which is recovered in the form of sodium sulphate in the same way.

The regeneration of the anion exchange material in anion exchangers 5, 7 and 9 may be effected with alkaline solutions (NaOH, $Na_2CO_3$ etc.).

From time to time, or during each regeneration cycle, the anion exchangers may require rinsing. In such cases, soft rinse water may be drawn from supply tank 12 and passed downwardly through the exchangers and drawn off to the solar still 13.

Owing to the partial regeneration, as contrasted to the full regeneration of the charges in cation or hydrogen-exchange materials, it will be necessary, in such operation, to repeat the regeneration cycle more often. But in view of the fact that such cation exchange materials are competent to undergo many hundreds of regeneration cycles, and also the fact that the regeneration action to a partial degree of regeneration is far less severe upon the cation exchange material, physically as well as chemically, than a complete regeneration cycle, a material advantage is secured in prolonging the effective life and capacity for work done by the cation exchange material before it becomes necessary to replace it. Moreover, the regenerating reagent, such as strong sulphuric acid, is substantially completely utilized in effecting such partial regeneration, and results in producing a substantially pure sodium sulphate, in equivalent proportions, as a by-product.

While water containing only chlorides will result in conversion to hydrochloric acid in the hydrogen ion exchangers, and will be removed in the form of insoluble hydrochloride in the anion exchangers, and recovered therefrom, in regeneration of the exchange material, as a chloride of the regenerant base, it is to be understood that the presence of other soluble salts in the water to be purified will lead to the recovery of their corresponding acids or anions, such as nitric acid, when nitrates are present, in the form of a nitrate of the regenerant base.

Similar recovery of valuable univalent cation components, such as potassium, lithium, or the like, when present in the water supply, may be effected in the cation exchangers, by using other regenerants therefor, having other cation-exchange actions (such as sodium sulphate instead of sulphuric acid), for the removal and recovery of potassium, yielding potassium chloride or potassium sulphate, instead of sodium sulphate as in the above instance, for example.

It should be understood that the present disclosure is for the purpose of illustration only and that this invention includes all modifications and equivalents which fall within the scope of the appended claims.

I claim:

1. The method of treating water containing cations in solution to replace cations therein with other cations, comprising the cyclical operation of alternately passing the water through a bed of solid water-insoluble cation exchange material in one direction, thereby substituting a cation from said exchange material for cations in the water, and passing a regenerant solution, containing regenerant cations in a concentration of no more than one equivalent per liter, in the opposite direction through said bed in an amount sufficient to regenerate said bed to less than about two-thirds of its total ion exchange capacity, thereby to establish a gradient ion exchange capacity through said bed, the flow through said bed being controlled throughout to maintain substantially the existing gradient of ion exchange capacity.

2. The method of treating water containing cations in solution therein to remove cations therefrom comprising the cyclical operation of alternately passing the water through a bed of solid water-insoluble cation exchange material in one direction, thereby substituting another cation for cations in the water, until the bed is substantially exhausted of its cation exchange capacity, and passing a regenerant solution, containing regenerant cations in a concentration of no more than one equivalent per liter, in the opposite direction through said bed in an amount sufficient to regenerate said bed by less than two-thirds of its total ion exchange capacity, thereby to establish a gradient ion exchange capacity through said bed, the flow through said bed of both water and regenerant being controlled throughout to maintain substantially the gradient of ion exchange capacity.

3. The method of treating water containing cations in solution to replace cations therein with other cations, comprising the cyclical operation of alternately passing the water through a bed of solid water-insoluble cation exchange material in one direction, thereby substituting a cation from said exchange material for cations in the water, passing a regenerant solution, containing regenerant cations in a concentration of no more than one equivalent per liter, in the opposite direction through said bed in an amount sufficient to regenerate said bed to less than about two-thirds of its total ion exchange capacity, thereby to establish a gradient ion exchange capacity through said bed, and removing the residual regenerant from said bed, the flow through said bed being controlled throughout to maintain substantially the existing gradient of ion exchange capacity.

4. The method defined by claim 1 wherein the regenerant solution is passed through the bed of cation exchange material in an amount sufficient to regenerate said bed about one-third of its total ion exchange capacity.

5. The method defined by claim 2 wherein the regenerant solution is passed through the bed of cation exchange material in an amount sufficient to regenerate said bed to about one-third of its total ion exchange capacity.

6. The method defined by claim 1 wherein the regenerant solution contains regenerant cations in a concentration, in equivalents, of at least five times the cation concentration of the water to be treated.

7. The method defined by claim 3 wherein the regenerant solution contains regenerant cations in a concentration, in equivalents, of at least five times the cation concentration of the water to be treated.

8. The method defined by claim 1 wherein the cation exchange material is a hydrogen ion exchange material.

9. The method of treating water containing cations in solution to replace cations therein with other cations, comprising the cyclical operation of alternately passing the water through a bed of solid water-insoluble cation exchange material in one direction, thereby substituting a cation from said exchange material for cations in the water, and passing a regenerant solution, containing regenerant cations in a concentration in equivalents of at least five times the cation concentration of the water to be treated and of no more than one equivalent per liter, in the opposite direction through said bed in an amount sufficient to regenerate said bed to about one-third of its total ion exchange capacity, thereby to establish a gradient ion exchange capacity through said bed, the flow through said bed being controlled throughout to maintain substantially the existing gradient of ion exchange capacity.

10. The method of treating water containing cations in solution to replace cations therein with other cations, comprising the cyclical operation of alternately passing the water through a bed of solid water-insoluble cation exchange material in one direction, thereby substituting a cation from said exchange material for cations in the water, passing a regenerant solution, containing regenerant cations in a concentration in equivalents of at least five times the cation concentration of the water to be treated and of no more than one equivalent per liter, in the opposite direction through said bed in an amount sufficient to regenerate said bed to about one-third of its total ion exchange capacity, thereby to establish a gradient ion exchange capacity through said bed, and removing the residual regenerant from said bed, the flow through said bed being controlled throughout to maintain substantially the existing gradient of ion exchange capacity.

WALTER JUDA.

REFERENCES CITED

The following references are of record in the file of this patent:

UNITED STATES PATENTS

| Number | Name | Date |
|---|---|---|
| 1,873,594 | Johnson | Aug. 23, 1932 |
| 1,903,958 | Clark | Apr. 18, 1933 |
| 2,127,310 | Riley | Aug. 16, 1938 |
| 2,151,883 | Adams et al. | Mar. 28, 1939 |
| 2,226,134 | Liebknecht | Dec. 24, 1940 |
| 2,259,169 | Little | Oct. 14, 1941 |
| 2,267,841 | Riley | Dec. 30, 1941 |
| 2,404,367 | Durant et al. | July 23, 1946 |

FOREIGN PATENTS

| Number | Country | Date |
|---|---|---|
| 805,092 | France | Aug. 17, 1936 |

OTHER REFERENCES

Industrial and Engineering Chemistry, September 1941, pages 1203–1212.